United States Patent [19]

Kawasaki

[11] Patent Number: 4,937,680

[45] Date of Patent: Jun. 26, 1990

[54] VIDEO SIGNAL REPRODUCING APPARATUS HAVING DROP-OUT COMPENSATION AND INTERPOLATION

[75] Inventor: Somei Kawasaki, Tokyo, Japan

[73] Assignee: Canon Kabushiki Kaisha, Tokyo, Japan

[21] Appl. No.: 189,663

[22] Filed: May 3, 1988

[30] Foreign Application Priority Data

May 13, 1987 [JP] Japan ................................. 62-114718

[51] Int. Cl.⁵ .............................................. H04N 5/94
[52] U.S. Cl. ..................................... 358/336; 360/38.1
[58] Field of Search ................ 358/314, 336; 360/38.1

[56] References Cited

U.S. PATENT DOCUMENTS 4,345,272  8/1982  Shirota ............................ 358/327 X Primary Examiner—Robert L. Richardson
Attorney, Agent, or Firm—Robin, Blecker, Daley & Driscoll

[57] ABSTRACT

A video signal reproducing apparatus for reproducing a video signal from a recording medium is arranged such that, if a signal drop-out occurs in the process of forming an interpolation video signal from the video signal reproduced from the recording medium, the interpolation video signal is inhibited from being produced in response to a signal indicating the occurrence of the signal drop-out. The arrangement ensures higher quality of the reproduced video signal.

18 Claims, 4 Drawing Sheets

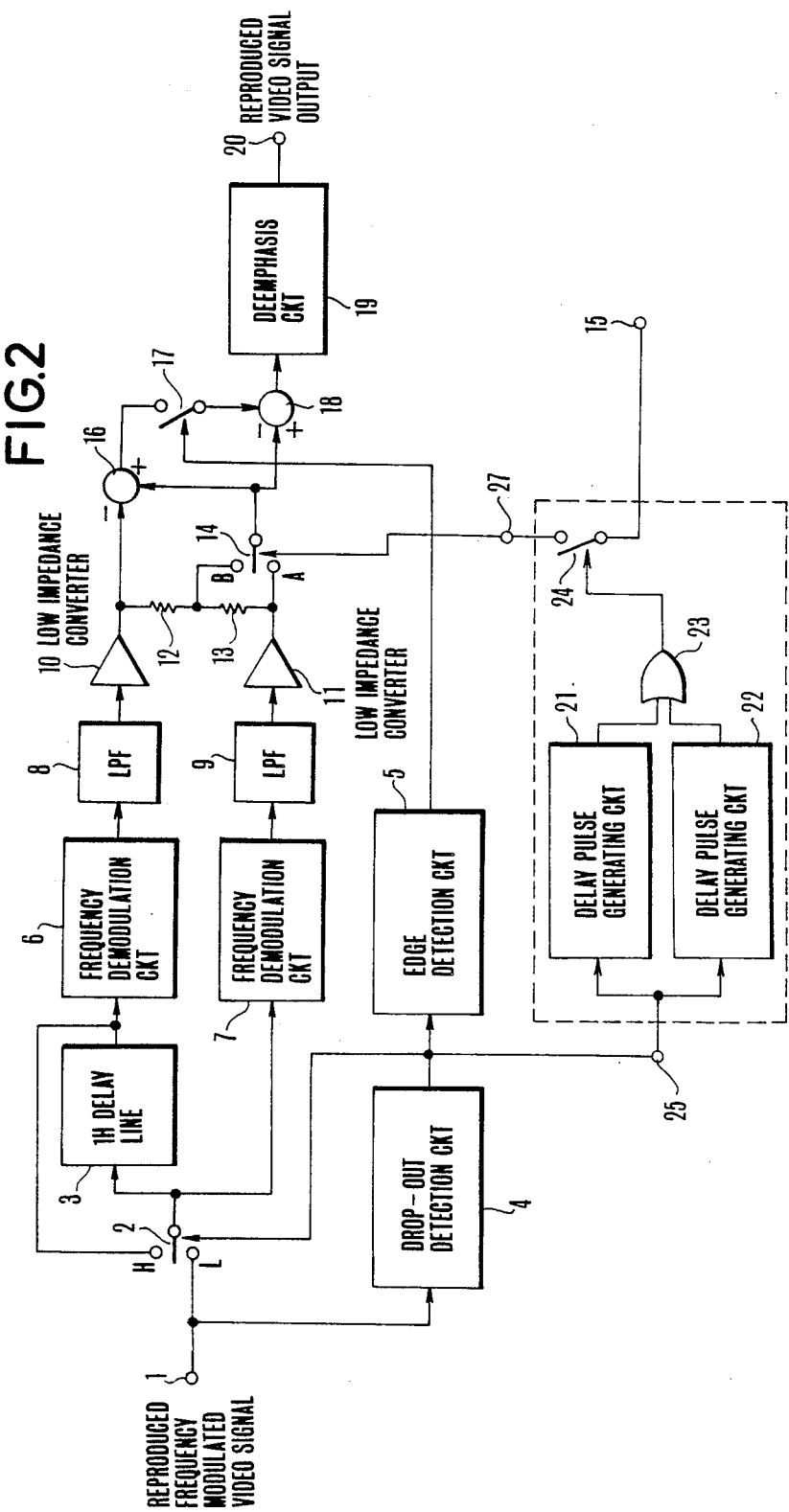

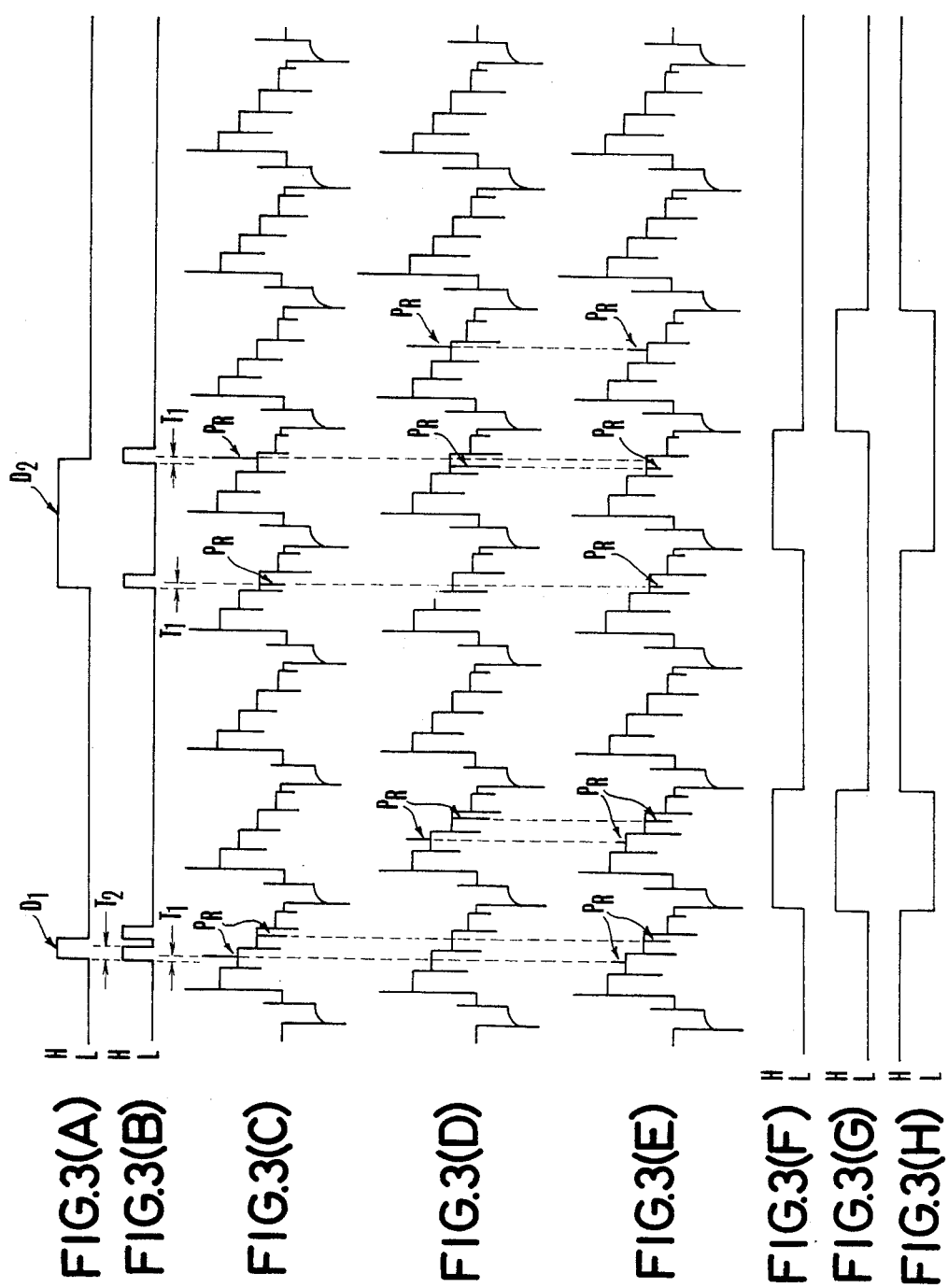

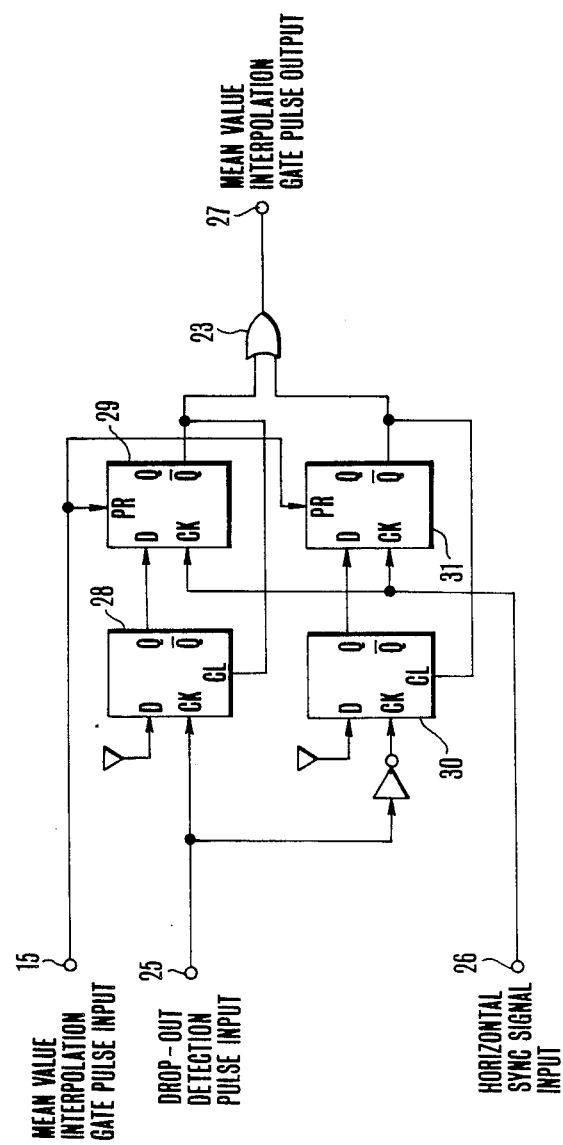

VIDEO SIGNAL REPRODUCING APPARATUS HAVING DROP-OUT COMPENSATION AND INTERPOLATION

BACKGROUND OF THE INVENTION

1. Field of the Invention

This invention relates to a video signal reproducing apparatus and more particularly to an apparatus which is arranged to ensure the high quality of a video signal in such case that a mean value-interpolation is to be effected when a drop-out compensation is to be effected or when a frame video signal is formed from a field video signal.

2. Description of the Related Art

In reproducing a video signal recorded on a recording medium in a frequency modulated state, some of known video signal reproducing apparatuses have been arranged to compensate for drop-outs that occur in the course of reproduction or to carry out a mean value interpolation of frame the event of forming a video signal in unit from a video signal of field unit. The conventional apparatus of this kind has been arranged as shown in a block diagram in FIG. 1 of the accompanying drawings.

Referring to FIG. 1, an input terminal 1 is arranged to receive a frequency modulated video signal which is reproduced from a recording medium. The apparatus comprises a switch 2; a one-horizontal scanning period (hereinafter referred to as 1 H period) delay line 3; and a drop-out detection circuit 4. The circuit 4 is arranged to produce a drop-out detection signal. The drop-out detection signal is at a high level when a drop-out takes place in the reproduced signal. The connecting position of the switch 2 is controlled by the drop-out detection signal. If a drop-out takes place, the position of the switch 2 is shifted to one side H thereof. By this, the reproduced video signal is compensated for the drop-out with the output of the 1 H period delay line 3.

Frequency demodulation circuits 6 and 7 are arranged to frequency demodulate the output of the 1 H period delay line 3 and that of the switch 2 respectively. Low-pass filters (LPFs) 8 and 9 are arranged to remove unnecessary frequency components from the frequency demodulated signals respectively. Each of the LPFs 8 and 9 has a delay time T1 between signal input time and output time. The apparatus includes low impedance converters 10 and 11; resistors 12 and 13; a switch 14; and an input terminal 15, which is arranged to receive a mean value interpolation gate pulse signal as will be further described later herein. The outputs of the low impedance converters 10 and 11 are supplied to an adding point of the resistors 12 and 13 which are of equal resistance values. The output of the adding point and the output signal of the low impedance converter 11 are supplied respectively to the two terminals of the switch 14. In case where the video signal reproduced from a recording medium (not shown) is a field video signal, in order to form a frame video signal in simple manner the switch 14 is so arranged that the change-over operation thereof is controlled at the field periods by a mean value interpolation gate pulse signal in coming from the input terminal 15. The mean value interpolation gate pulse signal consists of low and high level pulses which alternately appear at the field periods. The position of the switch 14 is on one side A thereof when the mean value interpolation gate pulse signal is at a low level and is on the other side B thereof when the gate pulse signal is at a high level. A mean value interpolation signal which is arranged to be taken out from the addition point of the resistors 12 and 13 is allowed to be produced while the switch 14 is on the side B. Under the control of the switch 14, however, the mean value interpolation signal taken out from the addition point is not allowed to be produced from the switch 14 at its equivalent pulse section where pulses of ½ H (½ of the horizontal scanning period) exist.

The apparatus further includes subtracters 16 and 18; a switch 17; a deemphasis circuit 19; and a reproduced video signal output terminal 20.

Referring to FIGS. 3(A) to 3(H), when drop-out pulses D1 and D2 which are as shown in FIG. 3(A) are produced from the drop-out detection circuit 4, the low impedance converter 11 produces a video signal which is as shown in FIG. 3(C). As apparent from the illustration, an inverting phenomenon is caused to take place in the reproduced video signal by the incontinuity of the reproduced frequency modulated video signal at the rising and falling points of the drop-out pulses D1 and D2. Then, depending on the time constant of the deemphasis circuit 19, this results in a tailing phenomenon, which is conspicuous to the visual sensation to deteriorate picture quality particularly in the event of reproduction of a still image. Therefore, it has been practiced to carry out a subtracting operation by means of the subtracter 16 on the output of the low impedance converter 10 which is the video signal output obtained by delaying it by one H period and the output of the low impedance converter 11 which is obtained without the delay of one H period. A non-correlating signal is thus obtained including the inverted pulse resulting from the incontinuity of the frequency modulated video signal. Then, the edge detection circuit 5 generates pulses of a pulse width T2 which is wider than T1. The level of these pulses becomes high at the rising and falling points of the drop-out pulses D1 and D2 and remains high during a period of time T2 (longer than T1) as shown in FIG. 3(B). The switch 17 is closed only for the period of time during which the pulses from the edge detection circuit 5 are at the high level. Then, the subtractor 18 subtracts from the reproduced video signal only the inverted pulse which is included in the noncorrelating signal produced from the above stated subtracter 16. After that, the reproduced video signal is produced via the deemphasis circuit 19 and the output terminal 20.

However, in cases where a frame video signal is to be obtained by mean value interpolation from a field video signal, a drop-out occurs during a horizontal scanning period of the reproduced, frequency modulated video signal within a field period during which the mean value interpolation is made as shown in FIGS. 3(D) and 3(E). With the drop-out occurred in this manner, if the inverted pulse PR takes place within the demodulated reproduced video signal, the inverted pulse PR also takes place in the mean value interpolation signal formed by using the portion of the reproduced video signal obtained during the horizontal scanning period having the inverted pulse PR. In that instance, the level of the inverted pulse PR attenuates to ½ of the level thereof obtained before the interpolation process. However, it has been impossible to completely remove the inverted pulse PR from the mean value interpolation signal formed by the conventional apparatus.

SUMMARY OF THE INVENTION

It is an object of this invention to provide a video signal reproducing apparatus which is capable of solving the above stated problem of the prior art.

It is another object of the invention to provide a video signal reproducing apparatus which is capable of forming an interpolation video signal by using a video signal reproduced from a recording medium without causing deterioration of picture quality due to any drop-out of the video signal that tends to take place in the process of reproduction.

To attain this object, a video signal reproducing apparatus arranged as an embodiment of this invention to reproduce a video signal from a recording medium on which the video signal is recorded comprises: interpolation video signal forming means, arranged to receive the video signal reproduced from the recording medium, for forming an interpolation video signal by using the reproduced video signal to produce the interpolation video signal; drop-out detection means, arranged to receive the video signal reproduced from the recording medium, for detecting a signal drop-out in the reproduced video signal to produce a drop-out detection signal; and control means for controlling the interpolation video signal forming means to cause the interpolation video signal forming means not to produce the interpolation video signal in response to the drop-out detection signal produced from the drop-out detection means.

It is a further object of the invention to provide a video signal reproducing apparatus which is capable of reliably compensating a reproduced video signal for any drop-out that takes place in the reproduced video signal in the process of reproducing a video signal recorded on a recording medium.

Under that object, a video signal reproducing apparatus arranged according to this invention as an embodiment thereof to reproduce a video signal from a recording medium on which the video signal is recorded comprises: drop-out detection means, arranged to receive the video signal reproduced from the recording medium, for detecting a signal drop-out occurred in the reproduced video signal to produce a drop-out detection signal; drop-out compensation means, arranged to receive the video signal reproduced from the recording medium, in the event of occurrence of a signal drop-out in the reproduced video signal received, for compensating the video signal for the signal drop-out according to the drop-out detection signal produced by the drop-out detection means; interpolation video signal forming means, arranged to receive the video signal reproduced from the recording medium, for forming and producing an interpolation video signal by using the reproduced video signal received; output means for alternately producing, with a switch-over action performed in a given cycle, the reproduced video signal produced from the drop-out compensation means and the interpolation video signal formed by the interpolation video signal forming means; and control means for controlling the output means such that, in case that the drop-out detection signal is produced from the drop-out detection means within a period during which the interpolation video signal formed by the interpolation video signal forming means is being produced from the output means, the reproduced video signal obtained from the drop-out compensation means is produced from the output means for a given period of time according to the output timing of the drop-out detection signal.

It is a further object of this invention to provide a video signal reproducing apparatus, wherein any drop-out that takes place in a reproduced video signal in reproducing the video signal from a recording medium can be compensated for without lowering the performance of the apparatus; and a part of the drop-out compensating arrangement of the apparatus can be utilized also as a part of an arrangement for forming an interpolation video signal from the reproduced video signal, so that the size, weight and cost of the apparatus can be lessened.

To attain this object, a video signal reproducing apparatus arranged according to the invention as an embodiment thereof to reproduce a video signal from a recording medium comprises: drop-out detection pulse output means, arranged to receive the video signal reproduced from the recording medium, for detecting a signal drop-out occurred in the reproduced video signal to produce a drop-out detection pulse signal; delay means, arranged to receive the video signal reproduced from the recording medium, for producing the received video signal delayed for one horizontal scanning period; drop-out compensation means for compensating the video signal reproduced from the recording medium for any drop-out thereof for a period of time during which the drop-out detection pulse signal is being produced from the drop-out detection pulse output means with the reproduced video signal which is obtained one horizontal scanning period before and is produced from the delay means to produce a drop-out compensated video signal; interpolation video signal forming means for forming an interpolation video signal by using the video signal reproduced from the recording medium and the reproduced video signal portion delayed one horizontal scanning period by the delay means to produce the interpolation video signal: output means for alternately producing, by performing a switch-over action in a given cycle, the video signal produced by the drop-out compensation means and the interpolation video signal produced from the interpolation video signal forming means; and control means for controlling the output means to produce therefrom the reproduced video signal obtained from the drop-out compensation means for one horizontal scanning period in accordance with the output timing of the drop-out detection signal when the drop-out detection signal is produced from the drop-out detection means while the interpolation video signal formed by the interpolation signal forming means is being produced from the output means.

The above and other objects and feature of the invention will become apparent from the following detailed description of embodiments thereof taken in connection with the accompanying drawings.

BRIEF DESCRIPTION OF THE DRAWINGS

FIG. 2 is a block diagram showing a video signal reproducing apparatus arranged as an embodiment of this invention.

FIGS. 3(A) to 3(H) show in a chart the operation of the video signal reproducing apparatus of FIG. 2 through the wave forms of signals produced from various parts of the apparatus.

FIG. 4 is a block diagram showing a part of a video signal reproducing apparatus arranged as another embodiment of the invention.

DETAILED DESCRIPTION OF THE PREFERRED EMBODIMENTS

Figure 1:
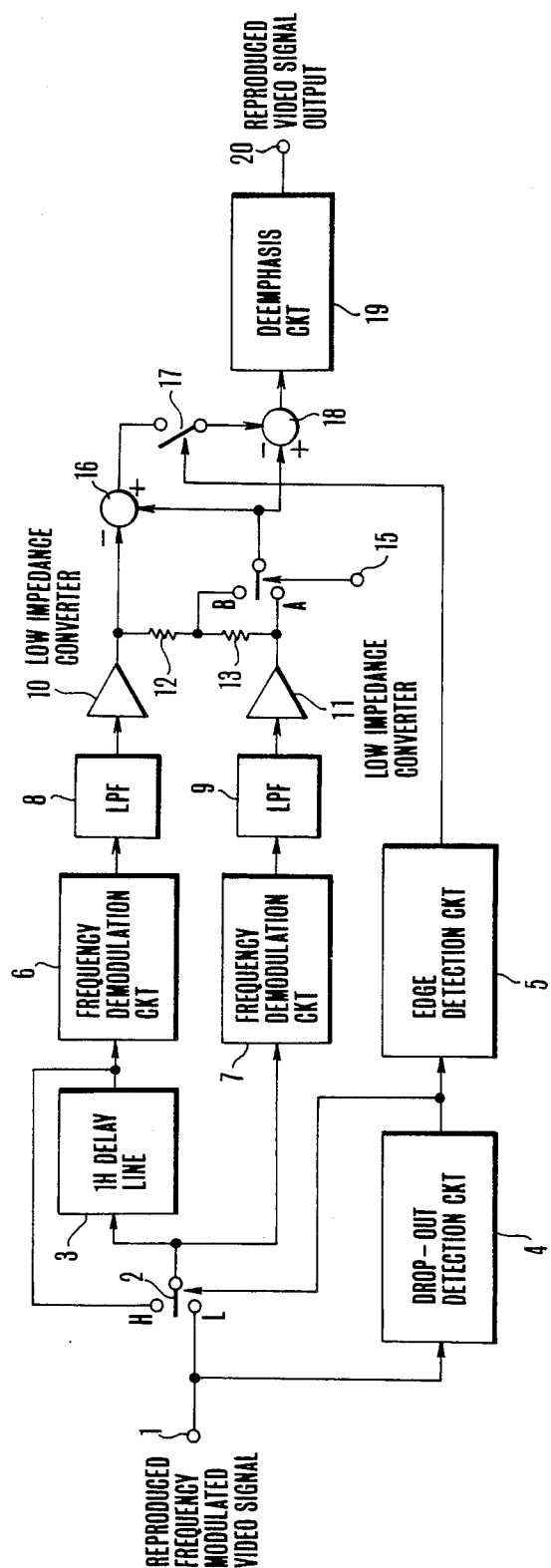
FIG. 1 is a block diagram showing the arrangement of the conventional video signal reproducing apparatus.

FIG. 2 shows in a block diagram a video signal reproducing apparatus which is arranged according to this invention as an embodiment thereof. The same parts as those of FIG. 1 are indicated by the same reference numerals and the details of them are omitted from the following description of the embodiment: A delay pulse generating circuit 21 is arranged to generate a pulse signal which is at a high level over one H (horizontal scanning) period from a pulse of a horizontal scanning signal immediately following a rising point of a drop-out pulse signal. Another delay pulse generating circuit 22 is arranged to generate a pulse signal which is at a high level over another H period from another pulse of the horizontal scanning signal immediately following a falling point of the drop-out pulse signal. The illustration includes an OR gate 23; a switch 24; and an input terminal 25 which receives the drop-out detection pulse signal generated by a drop-out detection circuit 4.

FIGS. 3(A) to 3(H) show in a wave form chart the operation of the embodiment of this invention shown in FIG. 2 as well as that of the conventional apparatus shown in FIG. 1. The details of the operation of the video signal reproducing apparatus of FIG. 2 are as described below with reference to FIGS. 3(A) to 3(H):

The drop-out detection circuit 4 supplies the drop-out pulse signal to the first delay pulse generating circuit 21 which is arranged to generate a pulse which is at a high level over a period of time corresponding to one H period after a horizontal synchronizing signal pulse immediately following the rising point of the drop-out pulse signal and also to the second delay pulse generating circuit 22 arranged to generate a pulse which is at a high level over a period of time corresponding to one H period after a horizontal synchronizing signal pulse immediately following the falling point of the drop-out pulse signal. The circuits 21 and 22 thus generate delay pulses as shown in FIGS. 3(F) and 3(G) respectively.

The delay pulses generated by the delay pulse generating circuits 21 and 22 are supplied to the switch 24 via the OR gate 23. The switch 24 closes, or turns on, and remains in an on-state throughout the period of time during which a low level delay pulse signal is supplied there from the OR gate 23. While the switch 24 is in the on-state, a mean value interpolation gate pulse which is received at the input terminal 15 is allowed to be supplied via the output terminal 27 to the switch 14. The connecting position of the switch 14 is on the side B thereof in the same manner as mentioned in the foregoing to produce a mean value interpolation signal for a period of time during which the mean value interpolation gate pulse is at a high level. Then, the interpolation signal is produced from the output terminal 20 via the subtracter 18 and the deemphasis circuit 19.

Further, while a high level delay pulse is supplied from the OR gate 23, that is, in the event of occurrence of a drop-out in a horizontal scanning line portion of the reproduced frequency modulated video signal received in one H preceding period, the switch 24 is in an off-state and the mean value interpolation gate pulse coming to the input terminal 15 is not allowed to be supplied to the switch 14. Therefore, the connecting position of the switch 14 is on the side A thereof to produce a signal which is produced from the low impedance converter 11, instead of the mean value interpolation signal. Then, the signal from the low impedance value is allowed to be produced from the output terminal 20 via the subtracter 18 and the deemphasis circuit 19.

As described above, in the event of occurrence of a drop-out in the one-horizontal-scanning-line portion of the reproduced frequency-modulated video signal received in one H preceding period, during a period of time for mean value interpolation, the reproduced video signal is inhibited from being formed by mean value interpolation. This arrangement of the embodiment prevents any adverse effect of the inverted pulse that follows the occurrence of the drop-out.

Such a drop-out that takes place only to an extent not exceeding one H period, as represented by the drop-out pulse D1 of FIG. 3(A), can be coped with solely by means of the first delay pulse generating circuit 21. However, a drop-out straddling two H periods cannot be adequately coped with by the use of the first delay pulse generating circuit 21 alone and calls for the use of the second delay pulse generating circuit 22. The provision of the second circuit 22 thus enables the apparatus to adequately cope with a drop-out not exceeding two H periods and to prevent any disturbance by the inverted pulse resulting from the drop-out.

FIG. 4 shows in a block diagram a part of a video signal reproducing apparatus which is arranged as another embodiment of the invention. The illustration corresponds to a part encompassed with a broken line in FIG. 2. In FIG. 4, parts similar to those of FIG. 2 are indicated with the same reference numerals and their details are omitted from the following description:

Referring to FIG. 4, the illustration includes input terminals 15, 25 and 26; an output terminal 27; and flip-flops (FFs) 28, 29, 30 and 31. A first delay pulse generating circuit 21 is formed jointly by the FFs 28 and 29. A second delay pulse generating circuit 22 is formed by the FFs 30 and 31. The operation of the embodiment shown in FIG. 4 is as described below with reference to FIG. 3:

The input terminal 15 is arranged to receive the mean value interpolation gate pulse. The input terminal 25 is arranged to receive the drop-out detection pulse and the input terminal 26 to receive a horizontal synchronizing signal. The output terminal 27 is arranged to produce an interpolation gate pulse which is newly formed by the embodiment of FIG. 4 as shown in FIG. 3(H). The switching operation of the switch 14 is controlled by this gate pulse. In the case of this embodiment, the delay pulse is arranged to be formed in synchronism with the horizontal synchronizing signal. This arrangement prevents any switching noise of the switch 14 from appearing on an image plane as the switching noise is allowed to occur only within a fly-back time.

As apparent from the foregoing description, the apparatus according to this invention is capable of preventing the disturbance due to the inverted pulse resulting from the occurrence of a drop-out by stopping the mean value interpolation for one horizontal scanning period immediately following the drop-out in synchronism with the rising or falling point of the drop-out.

What is claimed is:

1. A video signal reproducing apparatus for reproducing a video signal from a recording medium on which the video signal is recorded, comprising:
   (a) interpolation video signal forming means, arranged to receive the video signal reproduced from the recording medium, for forming an interpolation video signal by using the reproduced video signal to produce said interpolation signal;

(b) drop-out detection means, arranged to receive the video signal reproduced from the recording medium, for detecting a signal drop-out in the reproduced video signal to produce a drop-out detection signal; and (c) control means for controlling said interpolation video signal forming means to cause, in response to said drop-out detection signal produced from said drop-out detection means, said interpolation video signal forming means not to produce said interpolation video signal.

2. An apparatus according to claim 1, wherein said interpolation video signal forming means includes:

(a) delay means, arranged to receive the video signal reproduced from the recording medium for delaying the reproduced video signal for a first period of time; and (b) mean value video signal forming means for producing as said interpolation video signal a video signal corresponding to an average value of the video signal reproduced and input from the recording medium and the video signal reproduced a predetermined period of time before and input from said delay means.

3. An apparatus according to claim 2, wherein said interpolation video signal forming means further includes output means for enabling or disabling an output of said interpolation video signal formed by said mean value video signal forming means.

4. An apparatus according to claim 3, wherein said control means is arranged to inhibit, according to timing at which said drop-out detection signal is produced from said drop-out detection means, the interpolation video signal from being produced from said output means during a second period of time.

5. A video signal reproducing apparatus for reproducing a video signal from a recording medium on which the video signal is recorded, comprising:

(a) drop-out detection means, arranged to receive the video signal reproduced from the recording medium, for detecting a signal drop-out in the reproduced video signal to produce a drop-out detection signal;

(b) drop-out compensation means, arranged to receive the video signal reproduced from the recording medium, in the event of occurrence of a signal dropout in the reproduced video signal received, for compensating the video signal for the signal drop-out according to said drop-out detection signal produced by said drop-out detection means;

(c) interpolation video signal forming means, arranged to receive the video signal reproduced from the recording medium, for forming and producing an interpolation video signal by using the reproduced video signal received;

(d) output means for alternately producing therefrom, by performing a switch-over action in a given cycle, the reproduced video signal produced from said drop-out compensation means and the interpolation video signal formed by said interpolation video signal forming means; and (e) control means for controlling said output means such that, in case that said drop-out detection signal is produced from said drop-out detection means within a period of time during which the interpolation video signal formed by said interpolation video signal forming means is being produced from said output means, the reproduced video signal obtained from the drop-out compensation means is produced from said output means for a given period of time according to the output timing of said drop-out detection signal.

6. An apparatus according to claim 5, wherein an arbitrarily selected one-field period portion of the video signal recorded on the recording medium is repeatedly reproduced from the recording medium.

7. An apparatus according to claim 6, wherein said output means is arranged to alternately produce, for every one-field period, the one-field period portion of the reproduced video signal produced from said drop-out compensation means and the one-field period portion of the interpolation video signal formed by said interpolation signal forming means.

8. An apparatus according to claim 7, wherein said interpolation video signal forming means includes:

(a) delay means, arranged to receive the video signal reproduced from the recording medium, for delaying the reproduced video signal input for one horizontal scanning period; and (b) mean value video signal forming means for forming and producing, as said interpolation video signal, a video signal corresponding to an average value of the video signal reproduced and input from the recording medium and the reproduced video signal reproduced one horizontal scanning period before and input from said delay means.

9. An apparatus according to claim 8, wherein said control means is arranged, if said drop-out detection signal is produced from said drop-out detection means within a field period during which said interpolation video signal formed by said interpolation video signal forming means is produced from said output means, to allow the reproduced video signal produced from said drop-out compensation means to be produced from said output means for one horizontal scanning period according to the timing at which said drop-out detection signal is produced from said drop-out detection means.

10. An apparatus according to claim 5, wherein said drop-out detection means is arranged to receive the video signal reproduced from the recording medium, to detect a signal drop-out in the reproduced video signal received and to produce a drop-out detection pulse signal which is at a high level only for a period of time during which there exists the detected signal drop-out.

11. An apparatus according to claim 10, wherein said control means includes:

(a) first control pulse generating means for generating a first control pulse signal which is at a high level for a first period of time according to the rising timing of said drop-out detection pulse signal produced from said drop-out detection means; and (b) second control pulse generating means for generating a second control pulse signal which is at a high level for a second period of time according to the falling timing of said drop-out detection pulse signal produced from said drop-out detection means; and (c) output control signal generating means for generating an output control signal to cause said output means to produce the reproduced video signal produced from said drop-out compensation means for a period of time during which at least one of the first control pulse signal generated by the first control pulse generating means and the second control pulse signal generated by said second control pulse generating means is at a high level.

12. An apparatus according to claim 10, wherein said control means includes:
   (a) first control pulse generating means, arranged to receive a horizontal synchronizing signal, for generating a first control pulse signal which is at a high level for one horizontal scanning period from a horizontal synchronizing time point obtained after the rising timing of said drop-out detection pulse signal produced from said drop-out detection means;
   (b) second control pulse generating means, arranged to receive the horizontal synchronizing signal, for generating a second control pulse signal which is at a high level for one horizontal scanning period from a horizontal synchronizing time point obtained after the falling timing of said drop-out detection pulse signal produced from said drop-out detection means; and
   (c) output control means for generating an output control signal to cause said output means to produce the reproduced video signal obtained from said drop-out compensation means for a period of time during which at least one of the first control pulse signal generated by said first control pulse generating means and said second control pulse signal generated by said second control pulse generating means is at a high level.

13. A video signal reproducing apparatus for reproducing a video signal from a recording medium on which the video signal is recorded, comprising:
   (a) drop-out detection pulse output means, arranged to receive the video signal reproduced from the recording medium, for detecting a signal drop-out in the reproduced video signal to produce a drop-out detection pulse signal;
   (b) delay means, arranged to receive the video signal reproduced from the recording medium, for producing the received video signal delayed for one horizontal scanning period;
   (c) drop-out compensation means for compensating the video signal reproduced from the recording medium for any drop-out part thereof for a period of time during which said drop-out detection pulse signal is being produced from said drop-out detection pulse output means with the reproduced video signal which is obtained one horizontal scanning period before and is produced from said delay means to produce a drop-out compensated video signal;
   (d) interpolation video signal forming means for forming an interpolation video signal by using the video signal reproduced from the recording medium and the reproduced video signal delayed one horizontal scanning period by said delay means to produce said interpolation video signal;
   (e) output means for alternately producing, by performing a switch-over action in a given cycle, the video signal produced by said drop-out compensation means and the interpolation video signal formed by said interpolation video signal forming means; and
   (f) control means for controlling said output means to produce the reproduced video signal obtained from said drop-out compensation means for one horizontal scanning period in accordance with the output timing of the drop-out detection signal when the drop-out detection signal is produced from the drop-out detection means while the interpolation video signal formed by said interpolation signal forming means is being produced from said output means.

14. An apparatus according to claim 13, wherein an arbitrarily selected one-field period portion of the video signal recorded on the recording medium is arranged to be repeatedly reproduced.

15. An apparatus according to claim 14, wherein said output means is arranged to alternately produce, for every one-field period, a one-field period portion of the reproduced video signal produced from said drop-out compensation means and a one-field period portion of the interpolation video signal formed by said interpolation video signal forming means.

16. An apparatus according to claim 15, wherein said interpolation video signal forming means includes mean value video signal forming means for producing, as said interpolation video signal, a video signal corresponding to an average value of the video signal reproduced from the recording medium and the video signal reproduced one horizontal scanning period before and input from said delay means.

17. An apparatus according to claim 13, wherein said drop-out detection pulse output means is arranged to receive the video signal reproduced from the recording medium, to detect a drop-out in the reproduced video signal and to produce a drop-out detection pulse signal which is at a high level only for a period of time during which there is a drop-out in the reproduced video signal.

18. An apparatus according to claim 17, wherein said control means includes:
   (a) first control pulse generating means, arranged to receive a horizontal synchronizing signal, for generating a first control pulse signal which is at a high level for one horizontal scanning period ensuing the rising time point of said drop-out detection pulse signal produced from said drop-out detection pulse output means;
   (b) second control pulse generating means, arranged to receive said horizontal synchronizing signal, for generating a second control pulse signal which is at a high level for one horizontal scanning period ensuing the falling time point of said drop-out detection pulse signal produced from said drop-out detection pulse output means; and
   (c) output control means for generating an output control signal to cause said output means to produce the reproduced video signal obtained from said drop-out compensation means for a period of time during which at least one of the first control pulse signal generated by said first control pulse generating means and the second control pulse signal generated by said second control pulse generating means is at a high level.

* * * * *